June 21, 1960 N. R. ROGOVIN 2,941,350

TIMING ATTACHMENT FOR TELEPHONES

Filed July 1, 1957

INVENTOR

Nancy R. Rogovin

BY Rockwell & Bartholow

ATTORNEYS 2,941,350
Patented June 21, 1960

2,941,350

TIMING ATTACHMENT FOR TELEPHONES

Nancy R. Rogovin, 386 Prospect St., New Haven, Conn.

Filed July 1, 1957, Ser. No. 669,203

1 Claim. (Cl. 58—144)

This invention relates to an attachment for telephones and relates more particularly to an attachment for timing telephone conversations. Heretofore, attempts have been made to provide devices for attachment to telephones to time conversations, particularly long-distance or toll calls. Such devices have been proposed to enable one to have a visual indication of the time lapse during a telephone call and, hence, an indication of the cost of the call, inasmuch as calls of this type are usually charged at a rate based on the length of the call. However, at least certain of these proposed timing devices have been open to certain objections and one object of the present invention is to provide an improved timing attachment for telephones. For example, it is believed that none of the telephone time attachments heretofore proposed has been susceptible of mounting on all of the many different types of dial telephones. Accordingly, a further object of the invention is to provide a telephone timer attachment which it is believed many be mounted on any telephone of the dial type. Further objects of the invention will appear hereinafter from the following detailed description of the form of the timer shown in the drawing by way of example.

Figure 1:
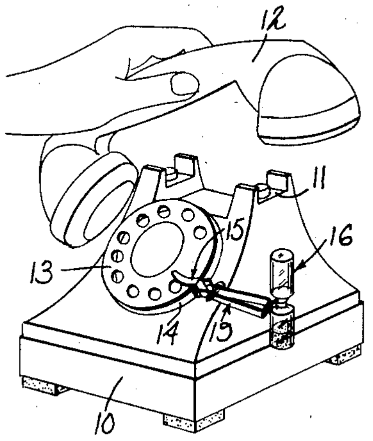
Fig. 1 is a perspective view illustrating a dial telephone having a timer embodying the invention attached thereto.

In the drawing, the base of a desk telephone is indicated at 10, the base having the usual cradle 11 for the handpiece 12. The base 10 is also provided with the usual rotary dial part 13 and a fixed dial part 14. Permanently affixed and rigid with the base 10 is the usual finger stop 15 for cooperation with the rotary dial part 13.

The attachment for timing telephone conversations is indicated generally at 16 and derives its entire support from the finger stop 15. In this connection it may be pointed out that while dial telephones are manufactured in various shapes and sizes, it is believed that they all have a finger stop similar to that shown in the drawing. Hence, it is believed that the timer attachment of the invention is susceptible of mounting on any dial telephone.

Figure 4:
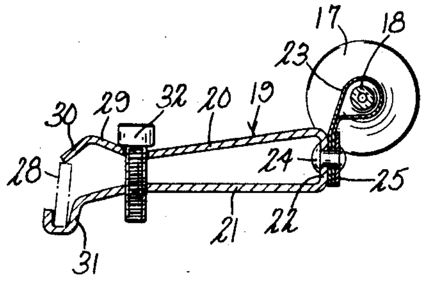
Fig. 4 is a sectional view taken on line 4—4 of Fig. 3.

The timer attachment 16 comprises an hourglass having a quantity of sand or like material therein. The hourglass may be formed conveniently by glass or plastic bubbles 17, 17′ interconnected by a narrow integrally formed neck 18 which restricts the passage of sand from one bubble to the other. The hourglass is supported through a bracket, indicated generally at 19, which may be releasably clamped to the finger stop 15 of the telephone. The bracket 19 is generally of yoke shape and has arms 20, 21 for clamping the finger stop 15 therebetween. The arms 20, 21 may be formed of sheet metal or other suitable material and are integrally interconnected by a part 22. A loop member 23, which may also be formed of sheet metal, provides a direct support for the hourglass and is swingably mounted on the part 22 by a rivet 24, the arrangement being such that the loop member 23 may be swung in either direction through an indefinite number of turns. As shown in Fig. 4, the rivet 24 extends through the ends of the loop member 23 and also extends through a washer 25 which overlies the last-mentioned ends. As shown in the last-mentioned view, the loop member 23 is of a circumference much less than the circumference of the bubbles 17, 17′ but loosely embraces the neck 18. As shown in this view, the hourglass is offset from the longitudinal axis of the bracket 19 so that the hourglass does not project from the side of the base 10 as much as it might if it were mounted in axial alignment with the bracket 19.

Figure 2:
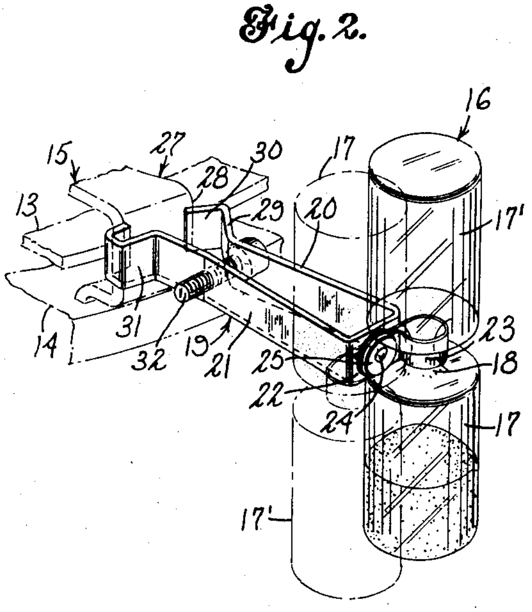
Fig. 2 is an enlarged fragmentary view illustrating the timer in perspective from a slightly different angle and showing the hour glass in a somewhat different position.
Figure 3:
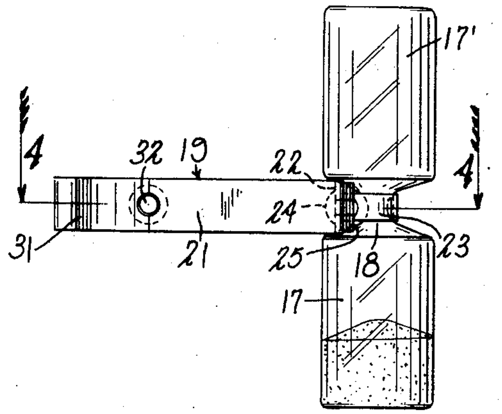
Fig. 3 is a side elevational view of the timer detached from the telephone.

As shown in Fig. 2, the finger stop 15 of the telephone has a portion 27 of trough shape and opening laterally. The rotary dial part 13 extends into the portion 27 approximately midway between the sides of the trough-shaped portion 27, and the arrangement is such that the rotary dial part 13 has only a little clearance with the bottom of the trough-shaped portion and only a little more clearance with the sides of the last-mentioned portion. This construction of the telephone raised certain problems in connection with mounting a timer attachment on the finger stop. The problem was further complicated by the inclination of the bottom 28 (see Fig. 4) of the trough-shaped portion 27. However, a partial solution to the problem was to make the arm 20 a little bit shorter than the arm 21 and to bend the arm 20 outwardly, as at 29, and then inwardly, as at 30, at the distal end thereof, so that this arm has edge contact with the upper edge of the finger stop 15. At its distal end the arm 21 is bent to form a channel portion 31 in opposing relation to the last-mentioned edge of the arm 20, the arrangement being such that the part 28 of the finger stop (see Fig. 4) extends into the portion 31. This construction resolved the aforementioned problems. The arms 20, 21 are clamped against the upper and lower edges of the finger stop 15 by means of a screw 32 extending through and having a head overlying the arm 20 in the region of the part 29, the screw 32 being threaded into the arm 21. From the foregoing it will be understood that the bracket 19 is removably clamped to the finger stop in a very secure manner without interfering with rotation of the dial part 13.

The operation of the timer will be understood from the foregoing. The quantity of sand or like material in the hourglass may be such, for example, that when the hourglass is in the full-line position of Fig. 2 and then is inverted to the broken-line position of Fig. 2, it will take three minutes for the sand to drain from the bubble 17 to the bubble 17′. A three-minute call may be timed in this manner. As previously stated, the hourglass may be rotated in either direction through an indefinite number of turns, and the hourglass projects outwardly to the side of the phone base 10 to only a slight extent so that catching of the same on foreign objects is inhibited. The mounting of the hourglass is such that it does not interfere with operation of the telephone. In this connection it may be pointed out that it is a distinct advantage that the attachment is not mounted either on the cradle of the telephone or the hand or mouthpiece.

From the foregoing disclosure it will be understood that there is provided an improved timing attachment for telephones of the dial type. It is believed that the attachment may be mounted on any telephone of the dial type. Furthermore, the timer is of very simple construction and may be manufactured at very low cost. It is easy to operate and does not interfere with the operation of the telephone. Furthermore, it may be readily clamped on the finger stop of a dial telephone and removed from the same if desired.

While only one form of the timing attachment has been illustrated in the drawings and described above, it will be understood that the attachment is susceptible of some changes in details without departure from the principles of the invention and the scope of the claim.

What I claim is:

A timer for attachment to a telephone of the dial type having a finger stop presenting upper and lower edges, a generally U-shaped bracket of strap form having a clamping screw cooperating with the arms thereof to adjust their end portions toward and away from one another, one arm being longer than the other, the longer arm having at its distal end a channeled portion cupping the lower edge of the finger stop, the shorter arm having at its distal end an inwardly extending portion in opposing relation to said channeled portion and presenting an edge part for clamping against the upper edge of the finger stop in angular relation thereto, the bracket deriving its entire support from the finger stop, an hourglass for support by the bracket, a loop member directly supporting the hourglass in embracing relation and having the ends thereof pivoted to the part of the bracket interconnecting the arms of the latter, so that the hourglass may be rotated with the loop member in a vertical plane, the last-mentioned member supporting the hourglass in offset relation to the longitudinal axis of the bracket.

References Cited in the file of this patent

UNITED STATES PATENTS 974,506 McAlarney ____________ Nov. 1, 1910
1,260,979 Jarmin ______________ Mar. 26, 1918
1,484,524 Naugle ______________ Feb. 19, 1924
1,774,775 Weitz ________________ Sept. 2, 1930
2,484,363 West _________________ Oct. 11, 1949

FOREIGN PATENTS 881,956 Germany ______________ July 6, 1953